Dec. 12, 1950   G. ATTERBURY   2,533,986
APPARATUS AND METHOD FOR FILLING MOLDS
Filed Sept. 22, 1944   2 Sheets-Sheet 1
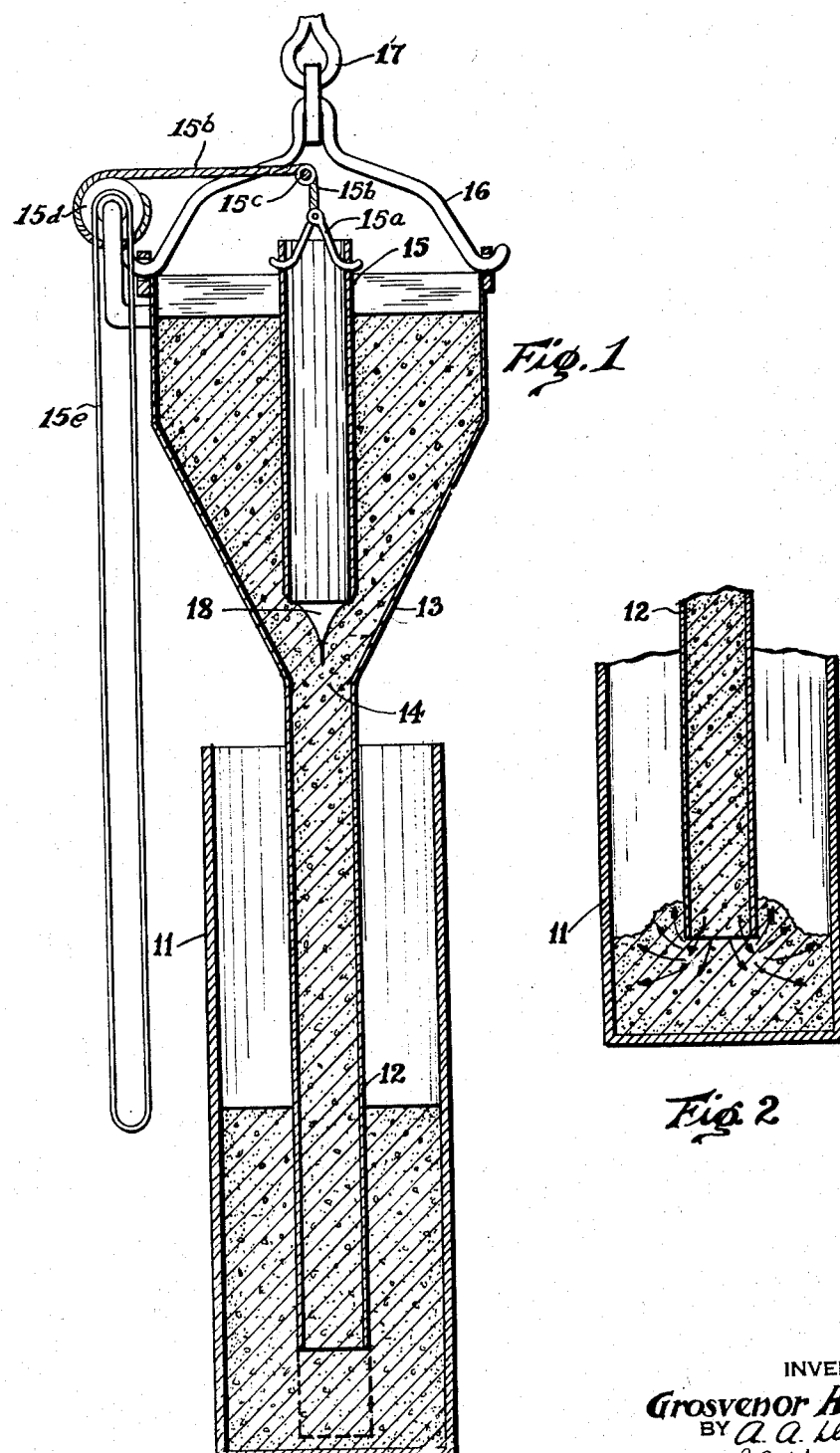
INVENTOR
Grosvenor Atterbury
ATTORNEYS

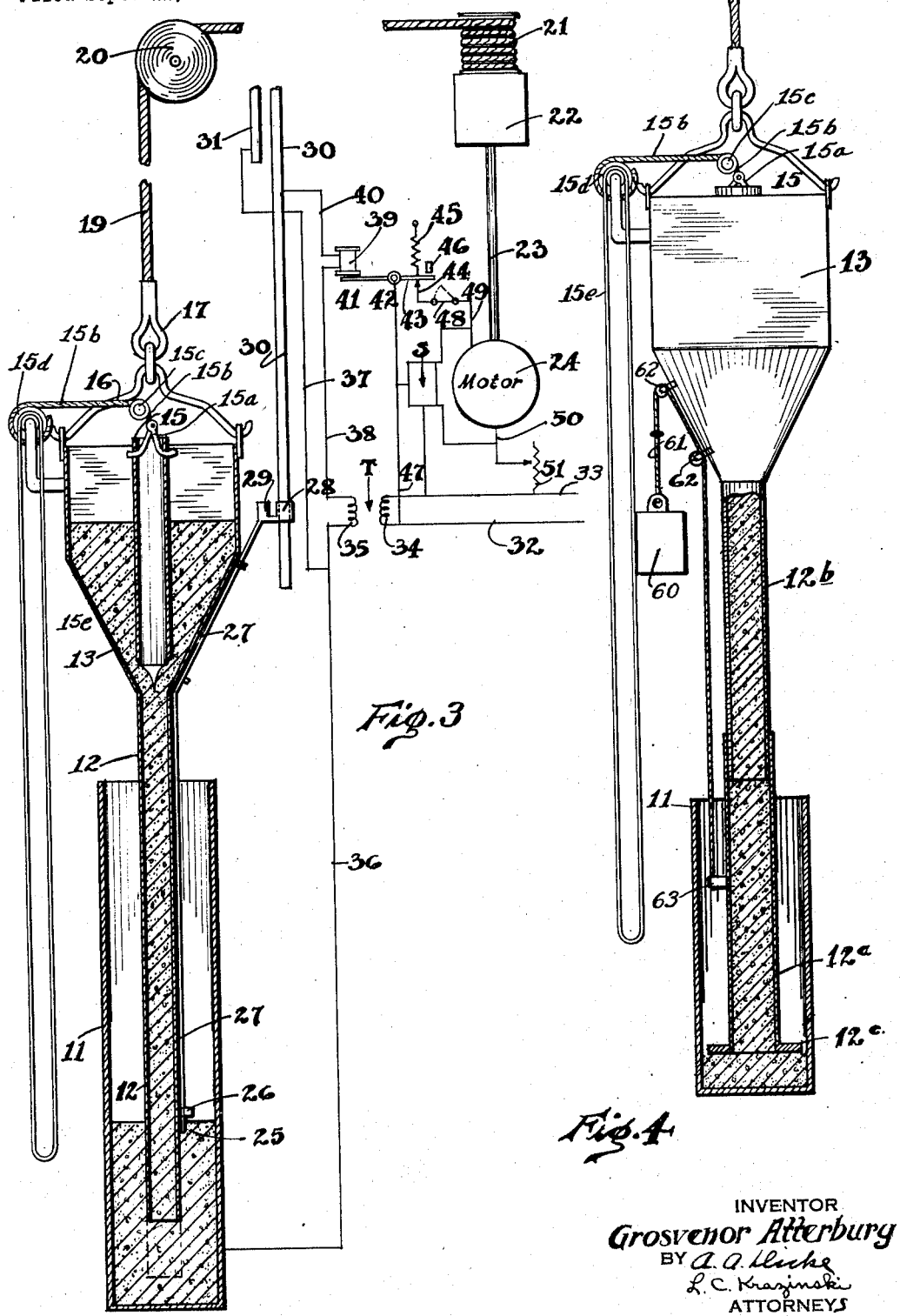

Patented Dec. 12, 1950

2,533,986

UNITED STATES PATENT OFFICE 2,533,986

APPARATUS AND METHOD FOR FILLING MOLDS

Grosvenor Atterbury, New York, N. Y., assignor to Precast Building Sections, Inc., New York, N. Y., a corporation of New York Application September 22, 1944, Serial No. 555,250

2 Claims. (Cl. 25—1)

This invention relates to apparatus and method for filling molds and has for an object to provide such apparatus and method especially adapted for quickly filling moulds with cementitious or other plastic materials or mixtures.

Another object is to provide such apparatus and method for quickly filling moulds with a cementitious or other plastic material without entrapping air and so as to avoid substantially all disarrangement or dislocation of the elements of the mix or material during the process of transfer from a tank or hopper into a mould or container.

Another object is to accomplish these desirable results by introducing the mix through a conduit which may initially be located near the bottom of the mould and arranging for the gradual lifting of said conduit as the level of the mix rises in the mould.

Another object is to construct and operate the apparatus in such a way that the filling conduit is submerged a predetermined distance below the top surface of the mix in the mould during the pouring operation.

Another object is to provide a hopper for containing the mix prior to pouring, said hopper being formed with a pouring outlet near its bottom, which outlet is at times closed by a hollow plug so that when the plug is lifted the mix may flow out of said outlet while the lifted plug forms a passage for the escape of any air in the tube or mix so that the air is not entrapped and carried into the mould or container with the flowing mix.

Another object is to provide such a hopper and connected filling tube together with means for lifting said hopper and tube during the filling time at a rate substantially the same as the rate of rise of the mix in the mould, said lifting means being preferably operated by power means the operation of which is controlled by the rate of rise of the mix in the mould.

Another object is to provide a hopper and mould filling conduit, the latter comprising at least two telescoping relatively slidable parts, the lower end of said conduit being formed with a foot resting upon the rising mix and being thereby lifted at a rate determined by the rate of filling of the mould.

Another object is to provide such an apparatus having a telescoping conduit together with means for hoisting the hopper at a rate approximately equal to the rate of rise of the mix in the mould (and therefore of the lower section of the telescoping conduit).

Another object is to provide suitable counterbalancing means to facilitate lifting of the lower section of the conduit in response to pressure thereunder exercised by the rising mix.

These and other features, capabilities, and advantages of the invention will appear from the subjoined detailed description of several embodiments of the invention illustrated in the accompanying drawings in which:

Fig. 1 is a vertical cross-sectional view of a mould and one form of apparatus for filling the same;

Fig. 2 is a fragmentary part of such an apparatus showing the filling conduit immersed in the mix a comparatively short distance;

Fig. 3 is an apparatus similar to that shown in Fig. 1 but showing in more or less schematic form means for hoisting the hopper and filling conduit at a rate determined by the rate of rise of the mix in the mould; and Fig. 4 is a view similar to Fig. 1, the hopper being shown in full and the conduit being shown in two telescoping sections, the lower section being provided with a foot resting upon the top surface of the mix and being lifted thereby.

Referring to said drawings, the numeral 11 designates generally a mould for receiving, for example, a cementitious mix. It is shown as cylindrical and the form of mould shown would produce when hardened a cylindrical post or pillar. It is to be understood that in accordance with standard practice the mould would be formed of two or more parts to permit its separation from the article produced after the mix has hardened. It is also to be understood that in accordance with known practice the article produced might be formed with one or more hollows produced by cores forming part of the mould.

The mould might, for example, be of the general type illustrated in my Patent No. 2,334,804, issued November 23, 1943, although it is to be understood that the apparatus and process are not to be limited to that type of mould or product or any other mould or product.

An important feature of my present invention is the accomplishment of hydrostatic filling of the mould, viz., the application of hydrostatic pressure to the mix as it is being introduced into the mould. If such a mould were filled in the ordinary manner by shoveling the mix into the mould or allowing it to pour as from a spout into the top of the mould, a considerable amount of air will be entrapped in the mix, and the ingredients will be disarranged, producing an uneven mixture and also resulting in the formation of air bubbles which will appear as voids in the mixture thus poured. If these voids in the case of a hardening mixture, such as cement, occur in the interior they serve to weaken the product and if they occur on the surface of the product they will destroy its appearance and cause rejection of the product or require refinishing of the product. In order to eliminate to a degree air bubbles in the mix, it has long been common practice to spade or rod such a mix as it is being introduced into the mould and/or after the mould is filled to facilitate escape of entrapped air. Another method frequently resorted to is to insert a vibrating apparatus into the mix. Both of these methods result in additional labor and expense and have been found to only partially eliminate entrapped air.

My present invention contemplates the feeding of the mix into the bottom of the mould or container under hydrostatic pressure as by the use of a conduit 12, the upper end of which is fixed to the bottom of a hopper 13 having an outlet 14 at its bottom, which outlet is ordinarily closed by a tubular stopper 15. The hopper may be lifted and transported by any suitable means such as the provision of a bail 16 supported by any suitable lifting means, such as a shackle 17.

In the use of this apparatus, the hollow stopper 15 is lowered into engagement with the hopper at its outlet 14 and the pouring apparatus is then inserted into the mould with the lower end of the tube 12 near the bottom of the mould. The hopper is then filled with the desired mix. It is, of course, to be understood that the apparatus may, if desired, be placed into this position after the mix is introduced into the hopper. The hollow stopper 15, which is guided for longitudinal movement by any suitable means, is then lifted an amount depending upon the desired rate of flow. The mix will begin to flow down the conduit 12, first displacing the air in the tube through the small space left between the lower end of the tube and the bottom of the mould or container and then rapidly filling the tube. The space below the foot of the tube is preferably only enough to allow escape of air but substantially to stop the passage of the more viscous mix. Thereafter, when the tube is substantially filled to its top (at the bottom of the hopper), the hopper with the tube is gradually raised, thus permitting the mix to flow down from the hopper through the tube, out of the bottom end, and spreading across the entire cross-section of the mould and rise around the tube. It will be noted that the mix flows down into the tube around the hollow stopper 15 in a more or less annular mass, leaving near its center a generally conical space 18 in communication with the hollow stopper 15, thus providing for the egress of the air there present as the mass of mix gradually fills the tube and then closes together into a continuous solid stream.

Conventional means may be used for raising and lowering the stopper 15 and for guiding it so it stays in alignment with the hopper outlet. An example is shown by the drawings where the stopper 15, illustrated as comprising a length of tube or pipe, has a bail 15a fixed to its top with this bail suspended by a rope 15b which is looped over a sheave 15c, fixed to the hopper bail 16, and wound on a windlass 15d fixed to the hopper side and turned by an endless rope 15e depending to a point convenient for the operator to use. In the usual fashion, the sheave 15c is aligned with the hopper outlet so the gravitational pull of the tubular stopper keeps it aligned with the hopper outlet, this guiding action, together with the conical hopper shape and its funnel-action guiding effect, giving a sufficient guided effect to the stopper tube 15 to keep it adequately centered in the hopper for it to function properly.

It has been found desirable to have the tube immersed a certain predetermined distance in the mix during the filling operation since this assures a more even top surface on the mix during the filling operation and avoids air entrapment. Thus, if the tube 12 is lifted at such a rate as to have a relatively small immersion, as shown in Fig. 2, the mix will rise to a higher point adjacent the conduit than at the outer parts of the mould. This is apparently due to the condition of flow as indicated by the arrows. The mix having an appreciable fluidity will naturally follow the path of least resistance and therefore the shortest path to the surface. Consequently, more mix will flow up the outside of the conduit than to the extreme edges and corners of the mould. This may result in building up the mix sufficiently to cause it to fall over onto the top of the more remote portions of the mix, resulting in the entrapment of air. Furthermore, the mix, in this case, is put in place under relatively low hydrostatic pressure. However, under the conditions shown in Fig. 1, the mix at about the point where it leaves the conduit 12 will be under a considerable hydrostatic head, causing compacting of the mix and certain filling of the mould, even when it is provided with corners some distance from the tube.

In operating the device of Fig. 1, the operator will cause the hoisting mechanism, not shown, to be operated to lift the hopper and conduit at such a rate that the conduit will be immersed in the mix to a substantial extent, which extent will be maintained as constant as the skill of the operator permits. This hoisting continues until the bottom of the conduit has at least reached the top of the mould, at which time the entire contents of the hopper will be contained in the mould. Thereafter, in the case of a cementitious mixture, for example, it will be merely necessary to trowel the top of the mix smooth and to remove excess material. Spading, rodding, and vibrating are entirely unnecessary and the mix is so undisturbed and uniform that, in the case of cementitious mixtures, laitance (the collection of water and cement at the top) is entirely absent. It has been found that by the use of this apparatus and process concrete articles, for example, can be made having a minimum of voids, an even distribution of ingredients, and having, in consequence, a smooth exterior surface entirely devoid of depressions formed by bubbles.

Various plastic mixes may be used, although it is necessary to use mixes having sufficient fluidity to accomplish the purposes desired. A cementitious mix which has been used successfully is the following:

|  | Parts by bulk |
|---|---|
| Portland cement | bags 1 |
| Sand (ordinary building sand) | cubic feet 2 |
| Gravel (up to about ⅜" diameter) | do 2 |
| Water, approximately 7 or 8 gallons. | |

The amount of water used will, of course, depend upon the amount of water already in the sand and gravel. It has been found desirable to use that amount of water which will give a result of about 9 or 10 inches by use of the standard "Slump" test.

The device of Fig. 1 is entirely satisfactory as the operator will, with some experience, have little difficulty in adjusting the flow down the tube and/or the rate of hoisting to a speed which will maintain the desired extent of the conduit in the mix. The extent of submergence may be controlled by varying the speed of hoisting or varying the extent to which the hollow plug 15 has been lifted. However, it is desirable in many cases to provide an automatic means for controlling the hoisting in accordance with the rate of rise of the mix in the mould. Such a means is shown, for example, in Fig. 3 wherein the numerals 11 to 18 indicate parts corresponding to correspondingly numbered parts in Fig. 1. It will be noted that the shackle 17 has connected thereto a cable 19 operating over a pulley 20 and winding upon any suitable hoisting drum 21 driven through any suitable transmission 22 by means of a shaft 23 driven by an electric motor 24. As shown, a contact 25 is mounted upon the conduit 12 at a certain distance from its lower end upon an insulator 26. Said contact has connected thereto a conductor 27, the upper end of which is connected to contact shoes 28 and 29. Shoe 28 is continuously in contact with a conductor bar 30 whereas shoe 29 contacts conductor bar 31 when the filling apparatus has been hoisted to a point where the contact 25 is approximately in line with the top of the mould 11.

In the form shown, conductors 32 and 33 are understood to supply alternating current to the primary winding 34 of a step-down transformer T having a secondary winding 35. It will be noted that one side of the secondary is connected through conductor 36 with the mould 11 and also through conductor 37 with the contact bar 31. The other side of the transformer secondary is connected through conductor 38 to the winding 39 of a relay, the other end of said winding being connected through conductor 40 with the contact bar 30. The relay may also comprise an armature 41 pivoted at 42 and having a movable contact arm 43 engageable with a stationary contact 44 when the relay coil 39 is energized. When it is not energized, spring 45 serves to move contact arm 43 away from contact 44, this motion being preferably limited by means of an adjustable stop 46. The supply conductor 32 is connected through conductor 47 with the relay at 42 and the contact 44 is connected through switch 48 and conductor 49 with the electric motor, the other side of which is connected through conductor 50 and rheostat 51 with the other supply conductor 33. The letter S indicates generally a manually-operated switch which may cause the motor to operate forwardly or reversely, as desired, even though the relay contact is broken and/or the switch 48 is open.

The operation of this device is as follows:

The hopper is filled. The apparatus is lowered into the mould until the bottom of the conduit is a short distance above the bottom of the mould or container, as shown in dotted lines. It will be noted that contact 25 is not in conductive relation with the mould or container 11 so that the relay coil 39 is not energized. The switch S is, of course, in neutral position. The tubular stopper 15 is now raised and the mix begins to flow down the conduit into the mould. It rises around the conduit until it touches the contact 25. This establishes a circuit from the transformer secondary 35 through conductor 36, mould 11, the cementitious mix, contact 25, conductor 27, shoe 28, contact bar 30, conductor 40, winding 39, and conductor 38, to the other side of the winding 35. This energizes winding 39 and causes contact 43 to engage contact 44, thus establishing a circuit from the supply lines through the motor as follows:

Supply line 32, conductor 47, contact arm 43, contact 44, switch 48, conductor 49, motor 24, conductor 50, rheostat 51, to the other supply conductor 33.

This causes the motor 24 to rotate in such a direction as to wind the cable 19 upon the drum 21, causing the hopper 13 and conduit 12 to be raised.

If the rate of raising is greater than the rate of rise of the mix in the mould, the contact 25 will be withdrawn from the mix, causing the relay coil 39 to be de-energized and causing the motor to stop. Shortly thereafter the rising mix will again start the motor. The general result will be that the conduit 12 is lifted at such a rate that the extent of submergence of the conduit in the mix will be substantially as shown in Fig. 3. This will continue from the time when the lifting begins until the contact 25 reaches approximately to the top of the mould. At this time the supply of mix will be substantially exhausted and, in any event, the mix cannot rise much above the top of the mould. However, at this time, shoe 29 begins to make contact with contact bar 31, establishing a circuit which will energize the relay and cause the hoisting to continue operating to the desired extent, for example, until the bottom of the conduit 12 has passed above the top surface of the mould so that it may be swung transversely by the hoisting mechanism. The circuit now effective is from the transformer secondary 35 through the upper part of conductor 36, through conductor 37, contact bar 31, brush 29, brush 28, contact bar 30, conductor 40, relay winding 39, and conductor 38, back to the winding 35.

The transformer T is preferably of the step-down type so that only relatively low voltages are applied to the mould, conduit, and hopper. It would be possible to use line voltage on the contact 25, in which case the relay could be dispensed with. Direct current equipment may, of course, be used either with or without a relay.

Fig. 4 shows a modified form of construction in which the conduit is shown formed of two telescoping parts 12a and 12b. The lower section is preferably formed with a shoe 12c which fits loosely within the mould and has an outline generally corresponding to the mould cross-section. In use, the mix flows down the conduit and spreads below the shoe 12c. As the mix rises, it exerts a pressure under the shoe 12c causing it and the conduit section 12a to be lifted. This action may, if necessary, be aided by means of a counterbalancing apparatus which may take the form of a counterweight 60 suspended from a cable 61 passing over pulleys 62 and attached at their other end as at 63 to the upper portion of the conduit section 12a. This form of the device may be operated either with or without concomitant hoisting of the hopper and the attached conduit 12b. The automatic hoisting system of Fig. 3 requires modification to adapt it to this example of Fig. 4, but the just suggested hoisting may be done manually in the manner described in connection with the device illustrated by Fig. 1.

If hoisting is not used, the lower section of the conduit will slide relatively to the upper section until the mould is filled. However, to avoid the friction and wear resulting from this relative movement, it is contemplated that the hoist may be used during the filling operation so that the hopper and upper conduit section 12b are raised at about the same rate at which the lower section 12a is being lifted by the incoming mix. If this is done there is no relative movement between the conduit parts.

This method of operation also has the advantage that the hydrostatic pressure is maintained more nearly constant during the filling operation due to the raising of the hopper.

With either method of operation I attain the desirable result that the shoe 12c applies a certain pressure to the mix at the time while it is being spread and finally located in the mould. This assures better compacting of the mixture and greatly increases the distance of the lateral flow of the mixture as it flows outwardly along the under surface of the shoe while any air bubbles will be brought to the periphery of the shoe where they may escape through the narrow space between the shoe and container to the atmosphere.

Whereas the member 11 is referred to in the specification and claims as a mould, it is to be understood that it may be any container whether or not it also serves the functions of a mould. Attention is called to this because the described process and apparatus is useful in transferring sem-liquid materials or mixtures from a hopper into a container where it is desired to do this without disturbing the component elements of the mixture and/or creating air bubbles or pockets, even though the material is not hardened into a casting, such as is the usual practice with a cementitious mixture.

It will be noted that the apparatus and methods described above will serve admirably to carry out the objects stated above. It is also pointed out that while various details in connection with the foregoing apparatus have been illustrated and described, this was merely for illustration, since various changes in the details of the apparatus and of the methods disclosed may be made by those skilled in this art without departing from my invention as defined by the following claims.

I claim:

1. A method of feeding a plastic fluent cement mix into an open topped mold, said method including positioning a tube vertically in said mold with the bottom tube end close enough to the mold bottom to define a space too restricted for said plastic mix to flow through it but large enough for the flow of air therethrough, flowing said mix gravitationally into the top end of said tube through a vertical funnel while positioning a pipe vertically in said funnel with its bottom end having a diameter dimensioned respecting the outlet of said funnel and spaced from said outlet so as to cause said mix to flow around said pipe's bottom end in the form of an approximately annular mass leaving beneath said pipe's bottom end a downwardly pointing approximately conical air space into which air or other gases entrained by said mix may escape and exit up through said pipe instead of being carried into said tube's top end, the latter thereby being fed with a substantially solid flow of said mix which flows practically solidly downwardly through said tube and forces the air therefrom downwardly and out through said space until said mix arrives at said space and stops because it can't flow therethrough, and subsequently lifting said tube to open said space at least enough so said mix can flow through said bottom tube end and into said mold, whereby said mix is fed into said mold under the hydrostatic pressure of its substantially solid head in said tube.

2. Apparatus for feeding a plastic fluent cement mix into an open-topped mold, said apparatus comprising a vertical hopper having a funnel bottom with an outlet from which a tube depends for insertion to the bottom of said mold, and a stopper having a lower end for closing said outlet and a long body reaching from said outlet vertically upwardly to above the contents level of said hopper, said stopper being vertically suspended in said hopper over and in alignment with said outlet, by a raising and lowering device, and having a passage extending from the center of its bottom end upwardly and exhausting above the contents level of said hopper, said tube being attached to said hopper so the two form a unit and said hopper having a controllable raising and lowering system including a material-actuated controller positioned on said tube closely adjacent its outside and spaced from its bottom end a distance effecting its actuation by said material only when the bottom end of said tube is immersed in said mix enough to prevent said mix flowing from said tube's bottom end upwardly so as to build up around said tube's outside.

GROSVENOR ATTERBURY.

REFERENCES CITED

The following references are of record in the file of this patent:

UNITED STATES PATENTS

| Number | Name | Date |
|---|---|---|
| 905,017 | Storck et al. | Nov. 24, 1908 |
| 1,256,074 | Taft | Feb. 12, 1918 |
| 1,881,106 | Vogt et al. | Oct. 4, 1932 |
| 2,111,663 | Graemiger | Mar. 22, 1938 |
| 2,136,224 | Weinreich | Nov. 8, 1938 |
| 2,167,123 | Meyer | July 25, 1939 |
| 2,208,028 | Harrington | July 16, 1940 |
| 2,216,786 | Sowden | Oct. 8, 1940 |
| 2,322,228 | Staebler | June 22, 1943 |
| 2,408,221 | Michel | Sept. 24, 1946 |

FOREIGN PATENTS

| Number | Country | Date |
|---|---|---|
| 24,121/29 | Austria | Dec. 11, 1929 |
| 425,072 | Germany | Feb. 10, 1926 |

OTHER REFERENCES

American Civil Engineers' Handbook, John Wiley & Sons, Inc., 1930 5th Edition—page 1031.